United States Patent
Pfister et al.

(10) Patent No.: US 7,258,383 B2
(45) Date of Patent: Aug. 21, 2007

(54) VEHICLE BODY

(75) Inventors: Klaus Pfister, Maulbronn (DE); Dimitar Danev, Renningen (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 224 days.

(21) Appl. No.: 10/999,951

(22) Filed: Dec. 1, 2004

(65) Prior Publication Data

US 2005/0134068 A1     Jun. 23, 2005

(30) Foreign Application Priority Data

Dec. 19, 2003   (DE) ............................... 103 59 768

(51) Int. Cl.
  *B62D 27/00*   (2006.01)
(52) U.S. Cl. ........................................ 296/29
(58) Field of Classification Search ................... 296/29
  See application file for complete search history.

(56) References Cited

U.S. PATENT DOCUMENTS

| 5,061,108 | A | * | 10/1991 | Bien et al. | 403/24 |
| 5,271,658 | A | * | 12/1993 | Haldenwanger et al. | 296/198 |
| 6,729,793 | B2 | * | 5/2004 | Cordebar | 403/316 |
| 7,086,679 | B2 | * | 8/2006 | Andre et al. | 296/29 |
| 2002/0149221 | A1 | | 10/2002 | Palmer et al. | |
| 2002/0163216 | A1 | * | 11/2002 | Delavalle et al. | 296/29 |
| 2003/0015882 | A1 | | 1/2003 | Nagae et al. | |
| 2005/0275227 | A1 | * | 12/2005 | Ahn | 293/155 |

FOREIGN PATENT DOCUMENTS

| DE | 2825838 | | 1/1980 |
| DE | 4106158 | A1 | 2/1992 |
| DE | 4432766 | A1 | 7/1996 |
| DE | 19803402 | * | 8/1998 |
| DE | 19856579 | * | 6/1999 |
| DE | 19809935 | C2 | 11/2002 |
| JP | 2000-335336 | | 12/2000 |
| JP | 2002-362266 | | 12/2002 |
| JP | 2002-370574 | | 12/2002 |

OTHER PUBLICATIONS

European Search Report dated Mar. 30, 2005.

* cited by examiner

*Primary Examiner*—Dennis H. Pedder
(74) *Attorney, Agent, or Firm*—Crowell & Moring LLP

(57) ABSTRACT

A vehicle body includes a first structural component and a second structural component that form the outer shell of the body. The structural components are joined in the area of equidirectional flanges, are locally detachably connected to each other, and delimit a joint in a common connecting area towards the vehicle exterior. A positioning device, which fixes two adjoining structural parts that form the outer shell of the body in the X and Y directions with respect to each other, is provided between the two adjoining structural components in order to ensure that a flush transition on the outer shell and an even course of the joint between the two structural components is provided in inaccessible areas between two adjoining structural components.

2 Claims, 5 Drawing Sheets

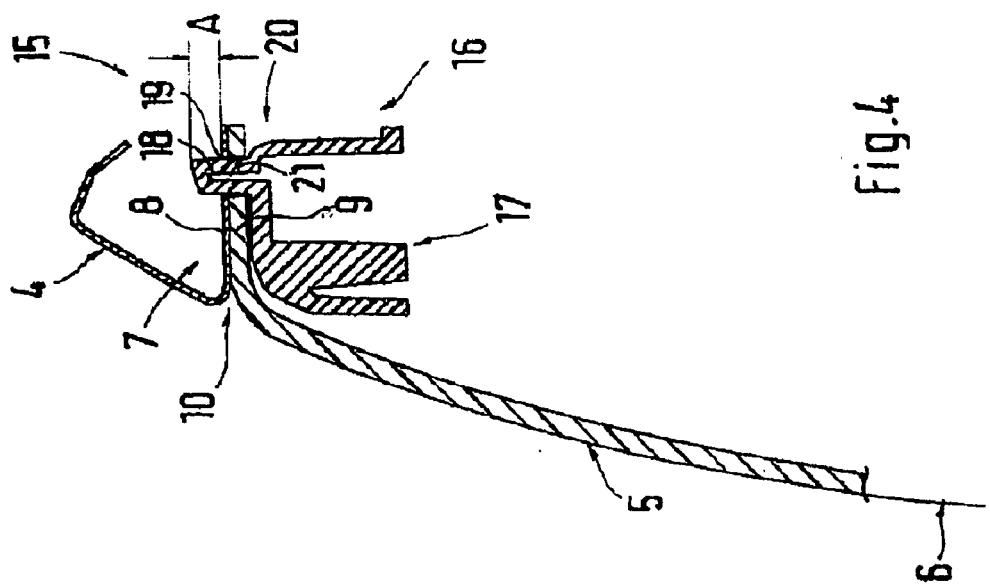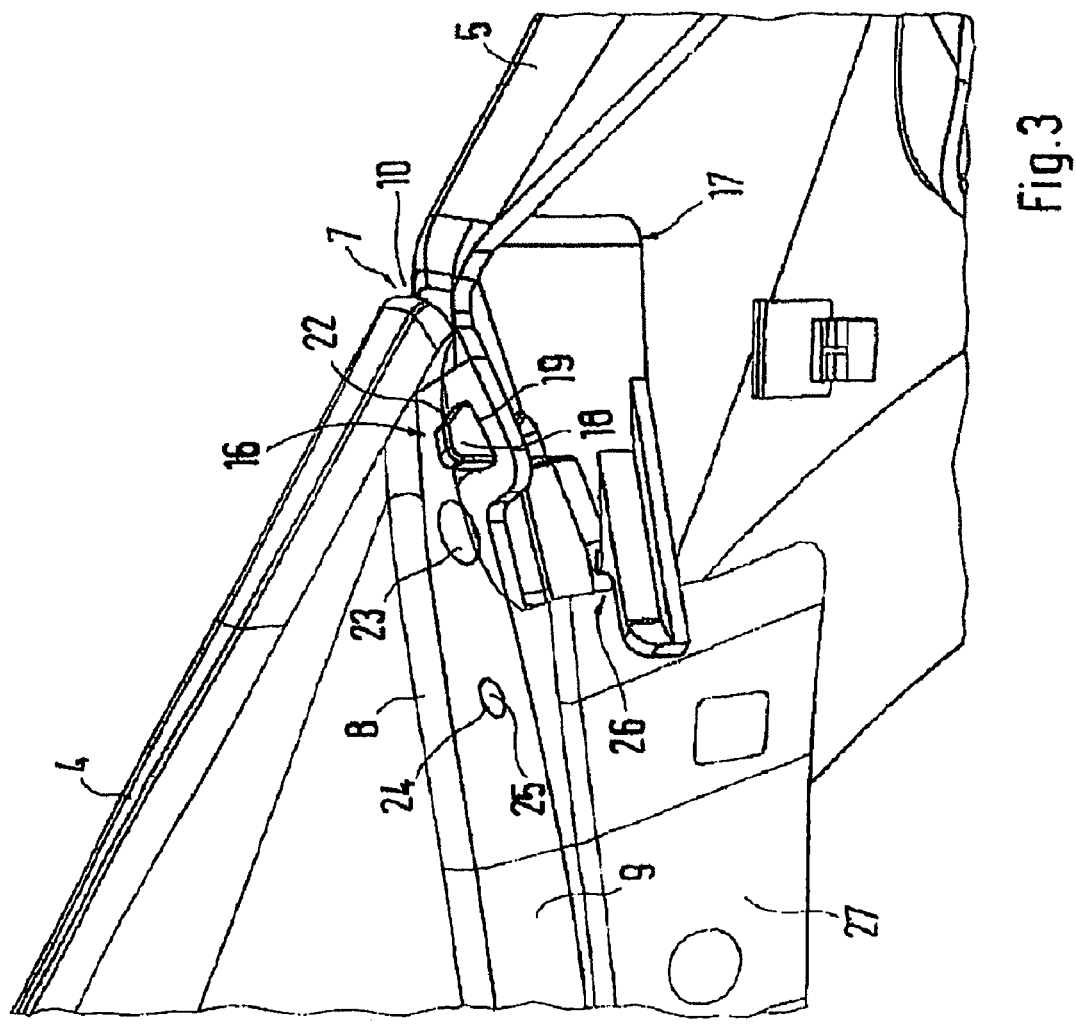

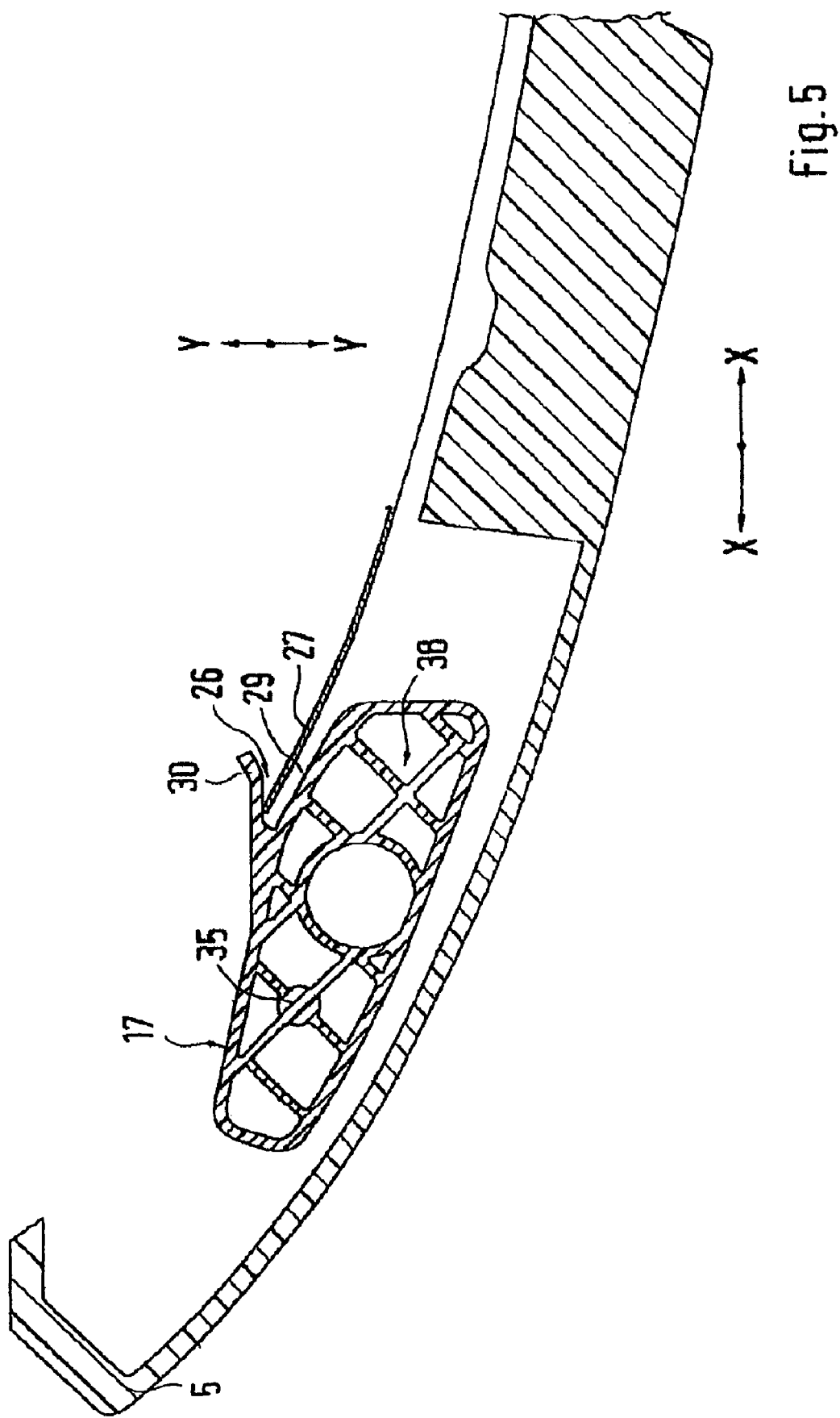

VEHICLE BODY

This application claims the priority of German application 103 59 768.9, filed Dec. 19, 2003, the disclosure of which is expressly incorporated by reference herein.

BACKGROUND AND SUMMARY OF THE INVENTION

The present invention relates to a vehicle body with at least one first structural component and at least one second structural component forming an outer shell of the body in which the structural components are joined in an area of equidirectional flanges, are detachably connected to each other, and delimit a joint towards a vehicle exterior in a common connecting area.

In known arrangements, a problem exists in that two adjoining structural components may rest against each other without attachment in inaccessible areas. Especially when at least one of these structural components is a polymer component, it is possible that the position of this structural component may change due to strong temperature effects. A flush transition on the outer shell and an even course of the joints between two adjoining structural components is therefore no longer given, which is, visually, extremely disruptive.

It is an object of this invention to take measures in inaccessible unattached areas of two adjoining structural components forming the outer shell of a vehicle body so that a flush transition on the outer shell and an even course of the joints between the two adjoining structural components is always given.

This object is achieved pursuant to the invention by way of a positioning device, provided in an inaccessible area between the structural components, which fixes the structural components with respect to each other. Additional features that provide the invention with an advantageous configuration are included in dependent claims.

The main advantages achieved with the invention are that a visually appealing continuous joint course as well as a flush transition on the outer shell between the two structural components is ensured by arranging a positioning device in inaccessible areas of two adjoining structural components.

The positioning device has a simple design, is inexpensive to manufacture, and comprises only one supporting part formed by an injection-molded polymer component as well as recesses on two equidirectional flanges.

One exemplary embodiment of the invention is explained in more detail with reference to the drawings.

BRIEF DESCRIPTION OF THE DRAWINGS

FIG. 3 shows a view from the inside of the two structural components with the positioning device arranged between them after completed installation, FIG. 4 shows a sectional view along line IV-IV of FIG. 2 in an enlarged illustration, FIG. 5 shows a sectional view along line V-V of FIG. 2 in an enlarged illustration.

DETAILED DESCRIPTION OF THE INVENTION

Figure 1:
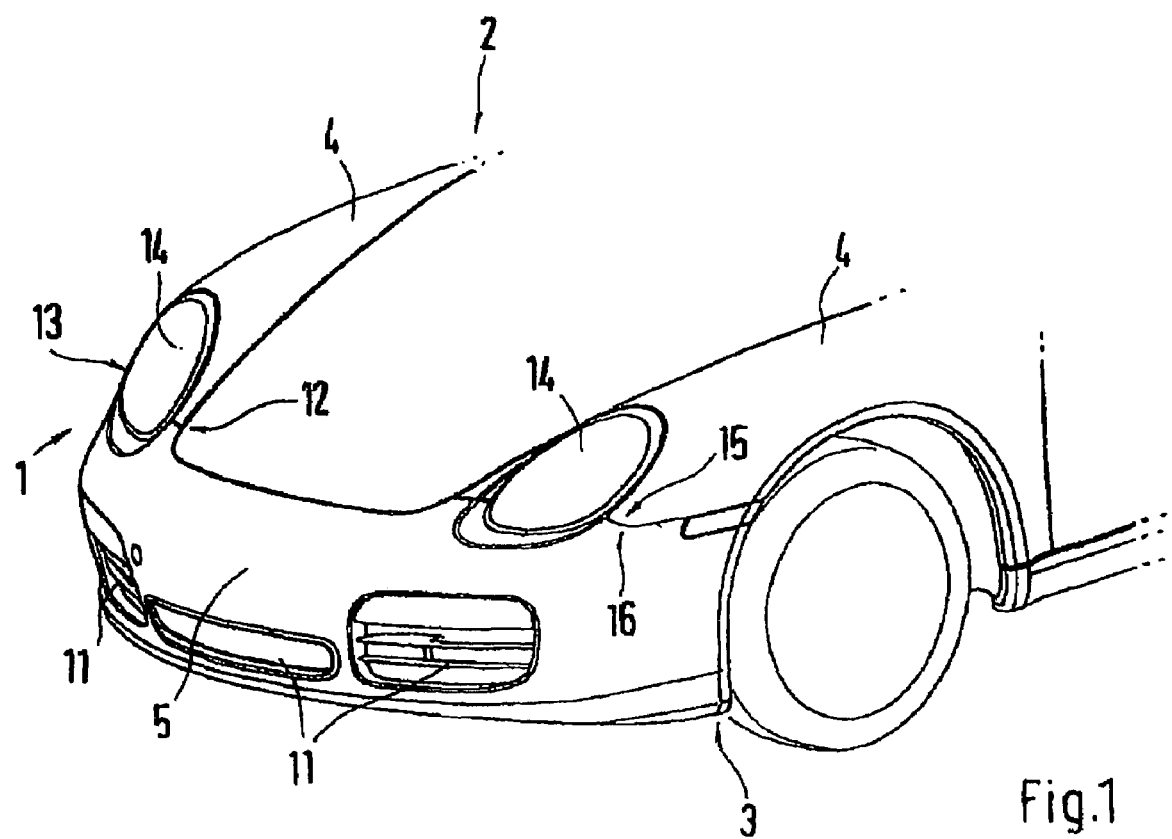
FIG. 1 shows a perspective partial view from the front at an angle of the front-end area of a motor vehicle.
Figure 2:
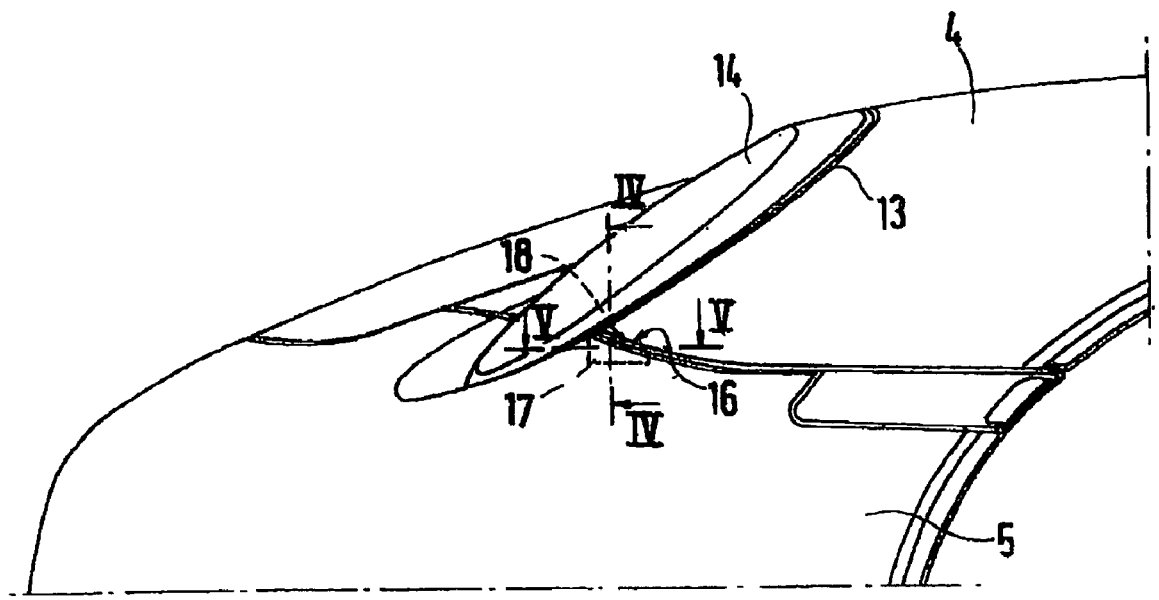
FIG. 2 shows a partial lateral view of the vehicle body with two adjoining structural components.
Figure 6:
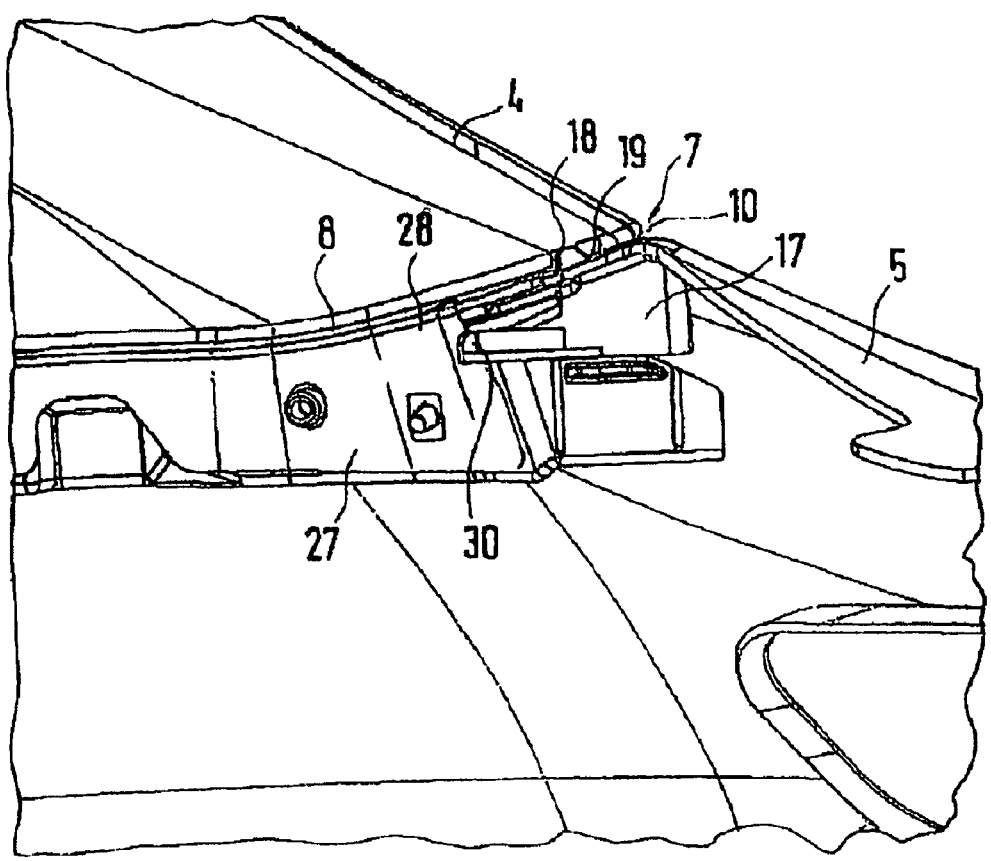
FIG. 6 shows a view from the inside onto both adjoining structural components and the positioning device.

FIG. 1 shows the front-end area 1 of a motor vehicle 2, the vehicle body 3 of which includes a first structural component 4 and a second structural component 5 in the illustrated area, which both form sections of the outer shell 6 of the vehicle. The structural components 4, 5 are joined at common connecting areas 7 to corresponding flanges 8, 9 and are detachably connected to each other in a manner that is not shown in further detail (for example, by screws, rivets, pins, or the like). The flange 8 extending inward is assigned to the first structural component 4 and the other flange 9 to the second structural component 5 (FIG. 4). The two structural components 4, 5 delimit a joint 10 toward the outside of the vehicle in the common connecting area 7.

In the embodiment shown, the first structural components 4 form a front fender, respectively, which is made of sheet metal, aluminum or polymer. The second structural component 5 is formed in the exemplary embodiment by a large surface front-end component made of a suitable elastic polymer, in which are provided localized cooling air openings 11. The second structural component 5 (front-end component) is guided from the front and from below toward the first structural components 4 (fenders) and is attached locally thereto. In transition areas 12 between the front-end component and the fenders are provided openings 13, in which the headlights 14 are installed.

In difficult to reach, unattached areas 15 between the two structural components 4, 5, for example, adjacent to the openings 13 accommodating the headlights 14, is provided a positioning device 16 between the two adjoining structural components 4, 5, respectively, which fixes both structural components 4, 5 in their correct position with respect to each other in the X and Y directions (vehicle longitudinal and vehicle transversal directions).

The positioning device 16 comprises a supporting part 17, which is preassembled on a structural component, for example, 5, with a molded-on projecting fixing section 18, wherein each fixing section 18 interacts positively with a recess 19 arranged on the flange 8 of the other structural component 4. The supporting part 17 is attached to the lower second structural component 5. The supporting part 17 is provided on the inside in an upper peripheral area 20 of the second structural component 5, specifically directly beneath the inwardly directed flange 9. The upwardly projecting fixing section 18 is guided through a recess 21 of the flange 9 and has such an extension in the vertical direction that it projects upward even beyond the flange 8 of the first structural component 4 arranged on top and projects beyond it by a dimension A (FIG. 4). The upwardly extending projecting fixing section 18 is configured with a cuboid shape in the exemplary embodiment and comprises on its upper end a tapered insertion area 22. A rectangular recess 19 is provided if the fixing section 18 has a cuboid shape. The fixing section 18 could also have a cylindrical configuration, while the recess 19 would then be configured with a circular shape.

The preassembly of the supporting part 17 on the second structural component 5 occurs by means of screws, rivets, gluing, or the like. A rivet connection 23 is provided between the flange 9 and the supporting part 17 located underneath it in the exemplary embodiment. In order to secure the supporting part 17 against rotation, an upwardly extending pin 24 is incorporated on its top at a distance to the fixing section, and that pin engages in an opening 25 of the flange 9 of the second structural component 5 located above it (FIG. 3).

On the side of the supporting part 17 facing away from the structural component 5 is configured a roughly V-shaped receptacle 26 when viewed in plan view, which encompasses a vertically aligned flange 27 of the first structural component 4. The flange 27 forms a stepped impression 28 of the first structural component 4 together with the flange 8.

The V-shaped receptacle 26 is formed by an upright wall section 29 of the supporting part 17 and a molded-on arm 30 (FIG. 5). The interaction between the receptacle 26 and the first structural component 4 prevents the second structural component 5 from moving in the transversal direction of the vehicle, that is, preferably outwardly, due to intense temperature changes or vibrations.

Figure 7:
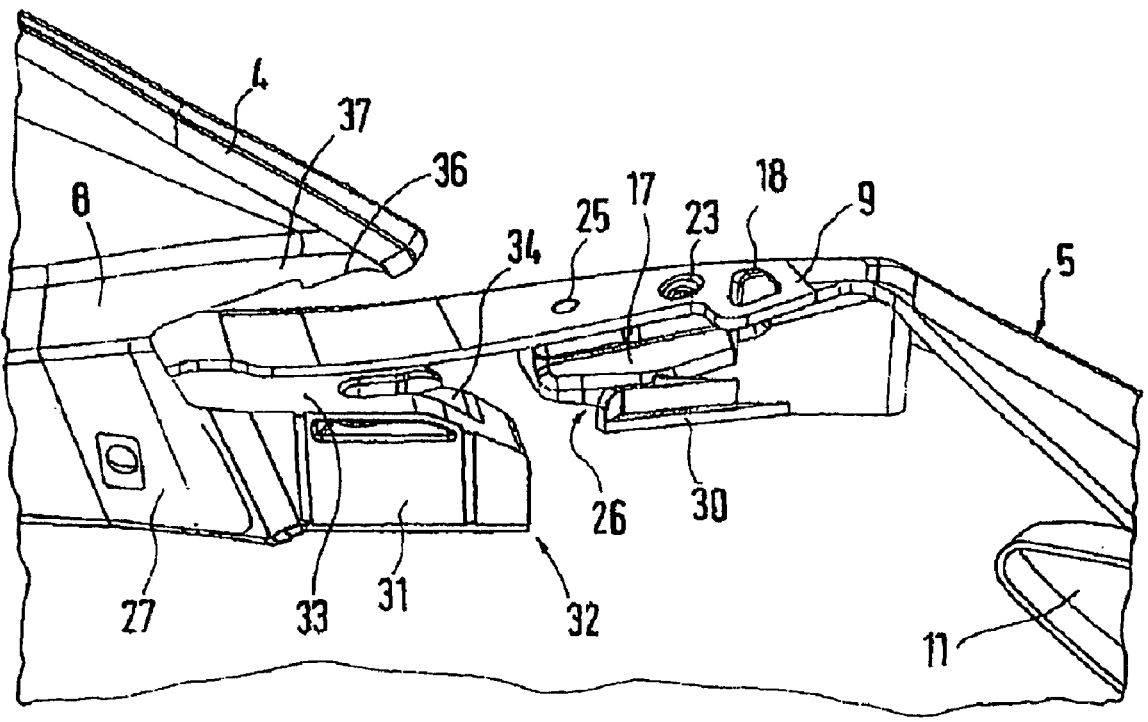
FIG. 7 shows a view from the inside onto both structural components and the positioning device, wherein the structural component assumes a forward assembly position.

A fastening strip 31 is attached on the first structural component 4, whose free end 32 projects in the longitudinal direction of the vehicle, in order to facilitate assembly of the second structural component 5. On the top 33 of the fastening strip 31 is incorporated a sunken funnel-shaped guide 34, in which engages a downward extending guide pin 35 of the supporting part 17 (FIG. 7). The second structural component 5 is centered by the funnel-shaped guide 34 in the transversal direction of the vehicle during assembly, and at the same time it is ensured that the projecting fixing section 18 comes into contact with the recess 19 on the flange 8 of the first structural component 4 located above it. The first structural component 4 comprises at its front end an undercut 36, that is, the vertical flange 24 and a partial area of the flange 8 end already ahead of the sharply pointed peripheral area 37 of the first structural component 4.

The supporting part 17 is formed by an injection-molded part made of polymer and has an inner rib-shaped reinforcement structure 38.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:
1. A vehicle body comprising:
an outer shell formed by at least one first structural component and at least one second structural component, the structural components being joined in an area of equidirectional flanges and detachably connected to each other and delimiting a joint towards a vehicle exterior in a common connecting area, and
a positioning device, provided in an area between the structural components that is difficult to reach, which fixes the structural components with respect to each other,
wherein the positioning device comprises a preassembled supporting part, mounted on one of the structural components, having a molded-on projecting fixing section, and wherein the fixing section interacts positively with a recess arranged on a flange of another of the structural components, and
wherein a V-shaped receptacle, which interacts with a vertical flange of the first structural component, is configured on the inside of the supporting part viewed in an insertion direction of the second structural component.

2. A vehicle body comprising:
an outer shell formed by at least one first structural component and at least one second structural component, the structural components being joined in an area of equidirectional flanges and detachably connected to each other and delimiting a joint towards a vehicle exterior in a common connecting area, and
a positioning device, provided in an area between the structural components that is difficult to reach, which fixes the structural components with respect to each other,
wherein a fastening strip, with a free end which projects in the longitudinal direction of the vehicle, is mounted on an upright flange of the first structural component, and
wherein a top side of the fastening strip is configured with a funnel-shaped guide into which a downwardly extending guide pin of the supporting part engages.

* * * * *